Patented Oct. 16, 1951

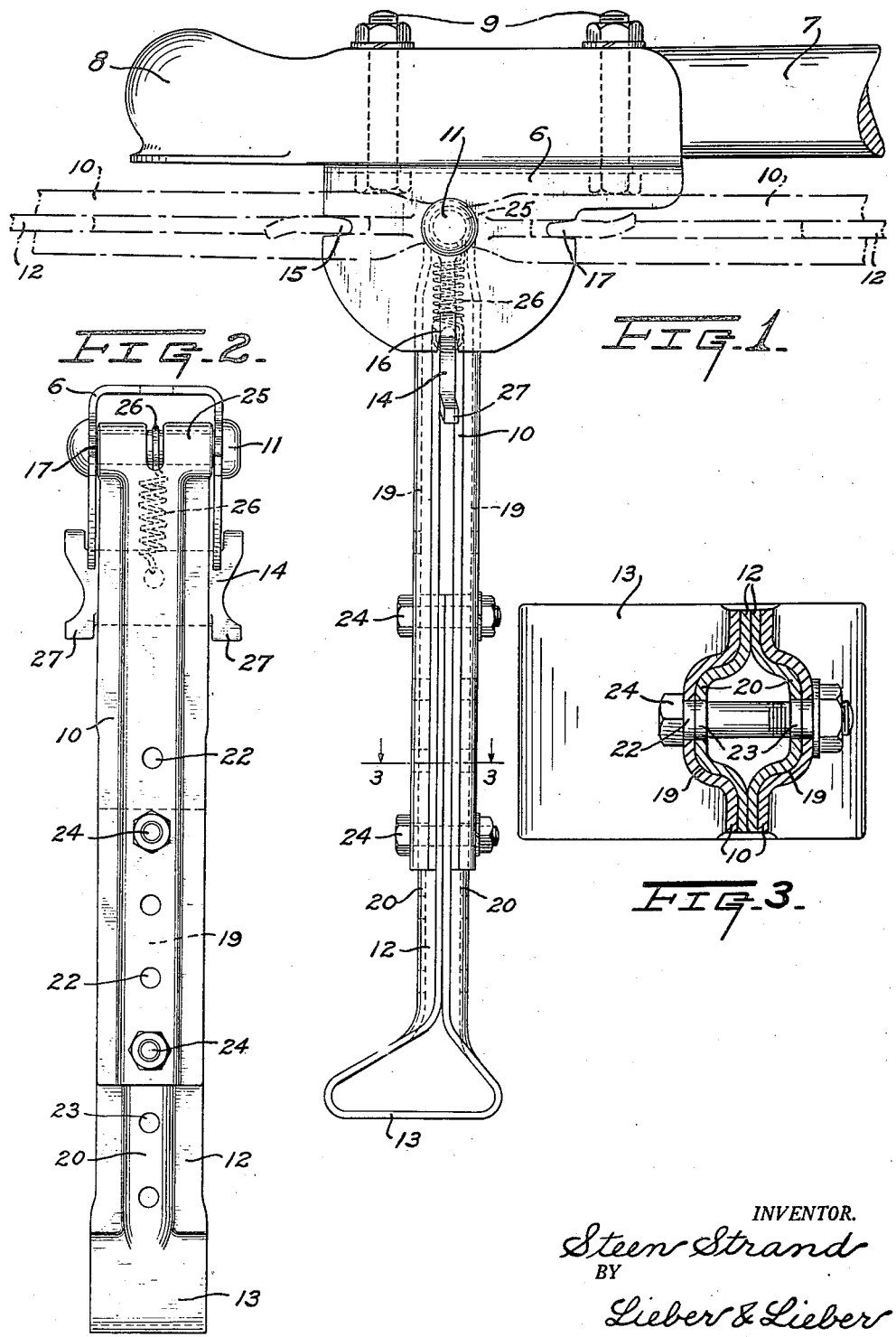

2,571,390

UNITED STATES PATENT OFFICE 2,571,390

TRAILER TONGUE STAND

Steen Strand, Milwaukee, Wis., assignor to The Fulton Company, West Allis, Wis., a corporation of Wisconsin Application February 2, 1950, Serial No. 141,980

4 Claims. (Cl. 280—33.4)

The present invention relates in general to improvements in attachments for facilitating the use of vehicle trailers, and relates more specifically to improvements in the construction of trailer draft tongue stands for manipulating and for preventing undesirable tilting of the trailers when detached from the pulling vehicles.

The primary object of my invention is to provide an improved trailer tongue attachment which is simple and durable in construction, and which is also highly effective in use and flexible in its adaptations.

It is usually desirable when vehicle trailers of the two wheel type having rigid draft tongues and when others having pivoted tongues, have been detached from their draft or pulling vehicles, to provide some means for maintaining the trailer bodies and tongues in normal position and for preventing the couplings at the ends of these tongues from dropping to the ground. In order to prevent such undesirable tipping of such trailer draft bars or tongues, it has heretofore been proposed to provide various types of trailer props or trailer draft tongue stands some of which were made adjustable in length so as to accommodate trailers of different heights. Some of these prior tongue stands or props are too flimsy to safely and effectively perform their intended function, while others are too difficult to apply and to manipulate, and still others are relatively complicated and costly, so that none of the previous props have become very popular with the trade for automobile trailer use.

It is therefore an important object of my present invention to provide an improved trailer tongue prop which obviates all of the objectionable features of the prior devices of this kind, and which may be easily applied, adjusted, and manipulated to place the same in either active or inactive position.

Another important object of this invention is to provide a simplified and sturdy stand for trailer tongues, which may be durably manufactured from sheet metal with the aid of punches and dies and sold at moderate cost, and which will effectively prevent the couplings associated with the tongues from dropping into mud and water when the trailer is parked and detached.

A further important object of the invention is to provide an improved automobile trailer tongue fixture which may be conveniently adjusted to accommodate trailers of various heights, and which is adapted to be firmly locked to the trailer draft tongue in either active approximately upright position, or in inactive substantially horizontal position beneath the tongue.

Still another object of my invention is to provide an automobile trailer tongue appliance which may be easily attached to the coupling end of an automobile trailer tongue in a manner whereby it may be readily utilized either as a prop to support the tongue, or as a draft extension for manually shifting the trailer when detached from the pulling vehicle, or disposed in inactive rearwardly extending inactive position beneath the draft tongue when the trailer is being drawn by the automobile.

These and other objects and advantages of the invention will be apparent from the following description.

A clear conception of the features constituting my present improvement, and of the construction and operation of a typical automobile trailer draft tongue stand embodying these features, may be had by referring to the drawing accompanying and forming a part of this specification wherein like reference characters designate the same or similar parts in the various views.

Fig. 1 is a side view of an automobile trailer tongue stand showing the same applied to a draft tongue with the leg in active tongue supporting position in solid lines, and also showing a fragment of this leg in inactive and in auxiliary draft positions in dot-and-dash lines;

Fig. 2 is a rear view of the same trailer tongue attachment alone, showing the same in active or tongue supporting position; and Fig. 3 is an enlarged transverse section through the leg of the stand shown in Figs. 1 and 2, the section having been taken along the line 3—3 of Fig. 1.

The gist of my present invention is the provision of a trailer tongue fixture having a longitudinally variable prop adapted to be swingably suspended from the coupling end of the trailer draft tongue so that the prop may be conveniently locked in various positions of adjustment relative to its carrying tongue, and while the typical embodiment illustrated and described herein is formed of sheet metal and is especially applicable to two-wheeled automobile trailers, it is not my desire or intent to unnecessarily restrict the utility of the improvement by virtue of this limited disclosure. It is also contemplated that specific descriptive terms used herein be given the broadest possible interpretation consistent with the actual showing.

Referring to the drawing, the improved trailer draft tongue stand shown therein, comprises in general an inverted U-shaped bracket 6 attachable to the trailer tongue 7 and coupling 8 by means of bolts 9; a composite elongated prop or leg composed of a bifurcated suspension section 10 swingably secured to the bracket 6 by a pivot pin 11, and a foot section 12 telescopically adjustable relative to the suspension section 10 and having an enlarged foot 13 at its outer end; and a latch plate 14 slidably confined between the bifurcations of the section 10 and interchangeably cooperable with notches 15, 16, 17 formed in the bracket 6 to lock the prop leg in various positions of angular adjustment relative to the trailer tongue 7.

The bracket 6 is preferably formed of relatively durable sheet metal with the aid of punches and dies; and the notches 15, 16 17 which are formed in the opposite depending side walls of this bracket, are of similar depth and formation and radiate from the pivot pin 11 being separated by arcuate quadrant surfaces formed on the bracket side walls. The trailer couplings 8 may be of various types, and as shown this coupling is also formed of sheet metal, and the bracket 6 may be firmly clamped to the trailer tongue 7 by means of the same bolts 9 which fasten this coupling 8 to the tongue 7.

The upper and lower sections 10, 12 of the composite prop or leg may also be formed of durable sheet metal with the aid of punches and dies, and as shown, the lower foot section 12 is confined and telescopically longitudinally adjustable between the bifurcations of the upper suspension section 10. As shown in Fig. 3, these telescopic leg sections 10, 12 are formed respectively with longitudinal slidably cooperating recesses 19 and beads or projections 20 which maintain the leg sections in proper alinement, and the sections 10, 12 are each provided with a series of holes 22, 23 of which different holes may be brought into alinement as the sections 10, 12 are longitudinally adjusted, for the reception of clamping bolts 24. The composite leg may thus be readily longitudinally adjusted to cooperate with trailer tongues 7 normally disposed at various distances from the ground.

The foot 13 is formed integral with the prop section 12 and is laterally enlarged or widened to prevent it from sinking into the ground when the leg is in active position and a load is applied, and to also serve as a handle when the leg is utilized as an auxiliary manual draft appliance. The upper end of the suspension section 10 is provided with an integral loop 25 which snugly but swingably embraces the pivot pin 11; and the latch plate 14 which may also be formed from heavy sheet metal with the aid of punches and dies, is slidable within the space between the opposite side walls or spaced bifurcations of the prop section 10 beyond the inner end of the section 12.

A helical tension spring 26 which is confined within the looped end of the leg section 10, has one end hooked about the pivot pin 11 and its opposite end secured to the medial upper end of the plate 14 by another end hook, thus constantly urging the latch plate toward the bracket 6 and confining it within the prop section 10. The opposite sides of the plate 14 also project beyond the section 10 for easy gripping, and are provided with off-set ears 27 which additionally serve to retain the latch plate in proper position. The inner edge of the latch plate 14 is alternately cooperable with either of the three sets of locking notches 15, 16, 17 by merely gripping the opposite sides thereof inwardly of the ears 27 and by pulling the latch outwardly and thereafter swinging the leg assembly to the desired position.

When the improved trailer draft tongue stand has been properly assembled and applied to a trailer tongue 7 with the aid of bolts 9 or the like, the length of the composite prop or leg should be adjusted by applying the bolts 24 to the proper holes 22, 23 so that the tongue 7 will be disposed in approximately horizontal position when the leg is in active substantially upright position as shown in solid lines in Fig. 1. With the prop in this active position the latch plate 14 will coact with the lower central notches 16 of the bracket 6 and will thus lock the composite leg in upright position.

When it becomes desirable to apply the trailer to a draft vehicle, the prop should be placed into inactive position as shown in dot-and-dash lines at the right of Fig. 1, and this may be done either before or after the trailer has been coupled to the pulling vehicle. In order to place the leg into inactive position it is merely necessary to pull the latch plate 14 downwardly against the action of the spring 26 until the latch clears the slots 16, whereupon the prop may be swung rearwardly until the latch plate 14 engages the rear notches 17 of the bracket 6. The leg will then be firmly locked in approximately horizontal inactive position beneath the draw bar or tongue 7, by the spring 26, latch plate 14 and notches 17.

If it becomes desirable to manually shift the trailer, the prop or leg may be swung forwardly from upright or active position after the latch plate 14 has been withdrawn from the notches 16, until the latch engages the front notches 15 of the bracket 6. The prop will then be locked in substantially horizontal forwardly extending position projecting beyond the coupling 8, and the widened foot 13 may be utilized as a handle to manually manipulate the trailer. The three series of notches 15, 16, 17 may thus be employed to lock the leg or prop in any of the three alternative positions while the spring 26 and plate 14 effectively lock the prop leg in the selected position.

From the foregoing detailed description it will be apparent that I have in fact provided an improved trailer tongue or draw-bar stand which is simple, compact and durable in construction, and which is conveniently manipulable to dispose and lock the prop or leg of the stand in various positions. The stand prop may be lengthened or shortened at will with the aid of the holes 22, 23 and bolts 24, and the foot 13 serves to prevent excessive sinking of the leg in soft earth. The foot section 12 while being readily telescopically adjustable within the suspension section 10, also provides a suitable gap or space within which the latch plate 14 is freely slidable, and this plate is confined in proper position within the pivot section 10 by the spring 26 and the ears 27. The entire stand unit comprises few simple but sturdy parts most of which may be fabricated of sheet metal with the aid of punches and dies, and which can be easily assembled and manipulated. The improved stands can therefore be manufactured and sold at moderate cost for association with various types of trailers, both of the two wheel type, and of multi-wheel types having pivoted draw bars or tongues.

The riveting of the pivot pin 11 at both ends to the adjacent side walls of the bracket 6, reenforces this bracket and also eliminates loose pins which are apt to drop out of place and become lost. The spring 26 also functions to automatically lock the leg or prop in various positions without the use of special tools. The improved stand when properly adjusted and utilized will positively prevent the couplings 8 from dropping upon gritty, moist or muddy soil, and thus enable these couplings to be kept clean and in good operating condition. The improved stands may be produced in various sizes and have proven highly satisfactory and successful in actual use.

It should be understood that it is not desired to limit this invention to the exact details of construction and operation of the precise trailer tongue stand herein specifically shown and described, for various modifications within the scope of the appended claims may occur to persons skilled in the art.

I claim:

1. In a trailer draft tongue stand, a sheet metal bracket attachable to the trailer tongue and having integral opposite side walls provided with downwardly and approximately horizontal open notches radiating from a common center, a composite leg having elongated telescopic sheet metal sections one of which is bifurcated and pivotally attached to said bracket side walls at said center and the other of which is confined between the bifurcations of said pivoted section and has an integral laterally widened foot at its end remote from said center, a sheet metal latch plate slidably confined between the bifurcations of said pivoted leg section and being interchangeably cooperable with said notches to positively retain said leg in either active or inactive position, and a spring also confined between the bifurcations of said pivoted leg section for constantly urging said latch toward said notched bracket walls.

2. In a trailer draft tongue stand, a bracket attachable to the trailer tongue and having opposite side walls provided with horizontal and vertical notches radiating from a common center and connected by arcuate intervening surfaces, a composite strut having a bifurcated elongated section pivotally attached to said bracket at said center and also having another elongated section telescopically adjustably confined between the bifurcations of said pivoted section, a latch plate slidably confined between the bifurcations of said pivoted strut section and having opposite side portions movable along said arcuate surfaces and interchangeably cooperable with said notches to retain said strut in either upright or horizontal position, and a spring also confined between said bifurcations for constantly urging said latch toward said bracket walls.

3. In a trailer draft tongue stand, a bracket attachable to the trailer tongue and having opposite depending side walls connected by a pivot pin and provided with peripheral notches radiating from said pin, a composite strut having a bifurcated elongated section swingably suspended from said pin and also having an elongated foot section telescopically adjustably confined between the bifurcations of said swingable section, a latch plate slidably confined between the bifurcations of said swingable strut section and having opposite side portions projecting outwardly beyond said bifurcations and interchangeably cooperable with said notches to retain said strut in either active or inactive position, and a helical tension spring confined between said bifurcations and connecting said latch with said pivot pin.

4. In a trailer draft tongue stand, a trailer coupling, a sheet metal bracket rigidly attached directly to said coupling and having opposite integral side walls rigidly interconnected by a pivot and provided with peripheral notches radiating from said pin, a composite strut having an elongated sheet metal bifurcated section swingably suspended from said pin and also having an elongated sheet metal foot section telescopically adjustable between the bifurcations of said swingable section, a sheet metal latch plate slidably confined between the bifurcations of said swingable strut section and having opposite side portions projecting outwardly beyond said bifurcations and interchangeably cooperable with said notches to retain said strut in either active or inactive position, and a helical tension spring connecting said latch with said pivot pin between said bifurcations.

STEEN STRAND.

REFERENCES CITED

The following references are of record in the file of this patent:

UNITED STATES PATENTS

| Number | Name | Date |
| --- | --- | --- |
| 767,635 | Daley | Aug. 16, 1904 |
| 1,741,598 | Ackerman | Dec. 31, 1929 |
| 2,118,004 | Black | May 17, 1938 |
| 2,162,181 | Skinner | June 13, 1939 |

FOREIGN PATENTS

| Number | Country | Date |
| --- | --- | --- |
| 6,703 | Great Britain | Mar. 19, 1902 |